(12) United States Patent
Lo

(10) Patent No.: US 8,503,435 B2
(45) Date of Patent: Aug. 6, 2013

(54) METHOD FOR CONTROLLING IP PHONE AND APPLICATION PROGRAM FOR THE SAME

(75) Inventor: Che-Sheng Lo, Hsin-Chu (TW)

(73) Assignee: Tecom Co., Ltd., Hsin-Chu (TW)

( * ) Notice: Subject to any disclaimer, the term of this patent is extended or adjusted under 35 U.S.C. 154(b) by 328 days.

(21) Appl. No.: 12/961,866

(22) Filed: Dec. 7, 2010

(65) Prior Publication Data

US 2012/0140765 A1 Jun. 7, 2012

(51) Int. Cl.
*H04Q 11/04* (2006.01)

(52) U.S. Cl.
USPC ............ 370/352; 370/252; 370/357; 370/389

(58) Field of Classification Search
USPC ................. 709/350–356; 370/350–356, 357, 370/389
See application file for complete search history.

(56) References Cited

U.S. PATENT DOCUMENTS

| | | | |
|---|---|---|---|
| 6,498,791 B2 * | 12/2002 | Pickett et al. ................. | 370/353 |
| 7,525,955 B2 * | 4/2009 | Velez-Rivera et al. ........ | 370/352 |
| 7,542,460 B2 * | 6/2009 | Kuwabara et al. ............ | 370/352 |
| 7,852,831 B2 * | 12/2010 | Akbar ............................ | 370/352 |
| 7,924,825 B2 * | 4/2011 | Dowling et al. .............. | 370/356 |
| 8,274,968 B2 * | 9/2012 | Rosenberg et al. ........... | 370/353 |
| 2004/0001479 A1 * | 1/2004 | Pounds et al. ................ | 370/352 |
| 2005/0099997 A1 * | 5/2005 | Kuwabara et al. ............ | 370/352 |
| 2005/0207432 A1 * | 9/2005 | Velez-Rivera et al. ........ | 370/401 |
| 2006/0018306 A1 * | 1/2006 | Nishida et al. ................ | 370/352 |
| 2006/0044283 A1 * | 3/2006 | Eri et al. ........................ | 345/173 |
| 2006/0187900 A1 * | 8/2006 | Akbar ............................ | 370/352 |
| 2008/0137643 A1 * | 6/2008 | Khanchandani et al. ..... | 370/352 |
| 2008/0291900 A1 * | 11/2008 | Yin et al. ....................... | 370/352 |
| 2009/0178126 A1 * | 7/2009 | Du et al. ............................ | 726/6 |
| 2011/0195694 A1 * | 8/2011 | Midtun et al. ................. | 455/413 |

* cited by examiner

*Primary Examiner* — Luat Phung
*Assistant Examiner* — Berhanu Belete
(74) *Attorney, Agent, or Firm* — Chun-Ming Shih; HDLS IPR Services

(57) ABSTRACT

A method for controlling an IP phone and an application program for the same are disclosed. The application program is installed in a computer for connecting the computer and a proximal IP phone via a wired or wireless network. A subscriber sends data and commands to the proximal IP phone via application programs in the computer for controlling the proximal IP phone. The computer establishes connection with a remote phone via an expanded function of the proximal IP phone controlled by the application program.

10 Claims, 4 Drawing Sheets

METHOD FOR CONTROLLING IP PHONE AND APPLICATION PROGRAM FOR THE SAME

BACKGROUND OF THE INVENTION

1. Field of the Invention

The invention generally relates to an IP phone, in particular, the present invention relates to a method for controlling an IP phone.

2. Description of Prior Art

Telephones have been an important and general means of communication in everyday life.

In recent years, as the Internet becomes popular, it has great impact on communication methods. Compare to landline telecom infrastructures, the Internet has the advantages of wider communication coverage. Voice calls between places in distance which previously requires multiple transfers via landlines now can be connected by the Internet promptly and directly.

As mentioned above, voice call application programs such as Skype are developed taking advantages of the Internet. Skype is a well-known application program used on a computer. A subscriber establishes voice call connection to a subscriber on the other end with computer having headphones and microphone via the Internet. An IP (Internet Protocol) phone is used for establishing voice calls precisely and quickly. In addition, subscribers are charged according to general internet service rate instead of expensive long distance phone rate.

Yet, the above application program has a defect. Subscribers have to power on the computer and execute the application program for establishing voice calls via the Internet. If receiving subscriber does not power on the computer or execute the application program, the status of the receiving subscriber is displayed as off line in the application program of the dialing subscriber and the voice call connection cannot be established. Thus, the dialing subscriber has to dial out to the receiving subscriber via a landline phone in order to request the receiving subscriber to power on the computer and execute the application program for establishing a free Internet voice call. Accordingly, the dialing subscriber saves cost generated from using landline telephone but the subscriber may find the steps inconvenient and complicated.

In view of this, an innovative telecom device, i.e. an IP phone, is developed in the market. An IP Phone is a device independent of a computer and can operate without a computer, where the Internet replaces the Public Switched Telephone Network (PSTN) for establishing a voice call with a remote IP Phone. Thus, subscribers do not need to change the dialing out process and are allowed to save telephone cost effectively.

Generally speaking, an IP Phone is more convenient to operate than a computer. Yet, there are subscribers who prefer to dial out IP voice calls with computers than using an independent IP phone. Therefore, it is desirable to integrate the IP Phone function into a computer.

For example, the US published patent application US20080137643 disclosed an Accessing Call Control Functions from An Associated Device. According to the US patent application, the connection between a computer and an IP Phone is established, and functions executed on the IP phone are provided to the computer. Next, the computer sends a first message to the IP Phone for controlling the IP Phone function to generate a voice call to a remote subscriber. Next, the IP Phone converts the first message to a second message sent to the remote subscriber for reminding the remote subscriber of the incoming call.

Though, the method disclosed in the US patent application makes it more convenient to make a voice call via an IP phone by controlling the IP phone with a computer. The computer is only configured to perform the function defined in the IP Phone. The powerful computing power of the computer is not optimized, nor is the connection between the computer and the IP Phone fully utilized. In view of this, it is desirable in the market to provide an innovative control method for a computer in order to make an IP phone more convenient to use and further effectively expand the functions of an IP Phone.

SUMMARY OF THE INVENTION

The objective of the present invention is to provide a control method for an IP phone and an application program for the same, wherein the data is transferred between the computer and the proximal IP phone via the application program and functions of the proximal IP phone is expanded in order to make it more convenient to establish connection of voice calls between the proximal IP phone and the remote phone.

In order to achieve the above goal, an application program of the present invention is installed in a computer for connecting the computer to a proximal IP phone via wireless Internet connection. A subscriber sends data and commands via the application program in the computer for controlling the proximal IP phone and expanding functions of the proximal IP phone controlled by the application program.

Compare to prior art, the present invention provide advantages such as searching proximal IP phones in the neighborhood of the computer available for establishing connection and performing control. Thus, a subscriber uses computer to dial out and send text message to a remote phone with the proximal IP phone. Further, the application program installed in the computer is used for transferring data and expanding functions of the proximal IP phone so as to perform expanded functions of the low cost proximal IP phone with general functions and the additional cost for purchasing extra required hardware for expanding functions is saved.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
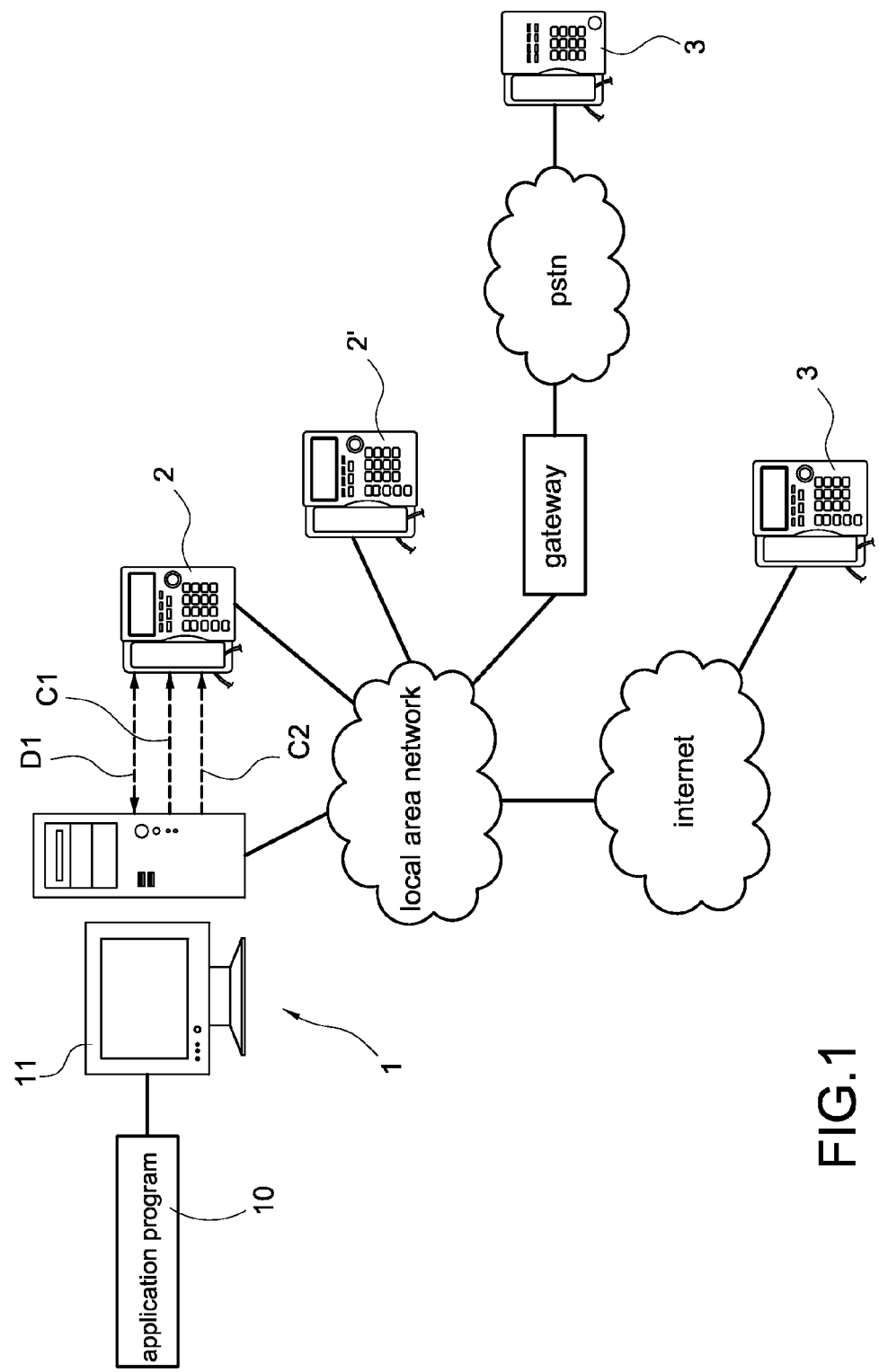
FIG. 1 is an architecture diagram of a preferred embodiment according to the present invention.

FIG. 1 is an architecture diagram of a preferred embodiment according to the present invention. The method and the application program of the present invention are mainly used between a computer 1 and a proximal IP phone 2. The computer 1 and the proximal IP phone 2 are connected within the same local area network. The proximal IP phone 2 is used for establishing voice call with a remote phone 3, wherein the remote phone 3 can be another IP phone or a landline telephone. If the remote phone 3 is another IP phone, the proximal IP phone 2 establishes voice call connection with the remote phone 3 via the Internet. If the remote phone 3 is a landline telephone, the proximal IP phone 2 is connected to the PSTN via a Gateway and establishes voice call connection with and the remote phone 3 via the PSTN.

The application program 10 is installed in the computer 1. The computer 1 searches for available proximal IP phones 2, 2' in the neighborhood by executing the application program 10. If a proximal IP phone 2 corresponding to the application program 10 and is not controlled by other computers among the proximal IP phones 2, 2' exists, the computer 1 is allowed to establish connection with the proximal IP phone 2.

Next, the computer 1 inter-transfers data and commands with the proximal IP phone 2 (for example the data D1, the first control command C1 and the disconnect control command C2 etc. in the diagram) in order to perform functions such as Click-To-Dial and Computer Telephony Integrated (CTI). It should be noted that the application program 10 can be downloaded from the Internet, or saved in a recordable recording medium in a computer. The method of the present invention is performed following the application program 10 is transferred to, installed in and executed by the computer 1. The method access to and install the application program 10 is not limited to the embodiment.

Figure 2A:
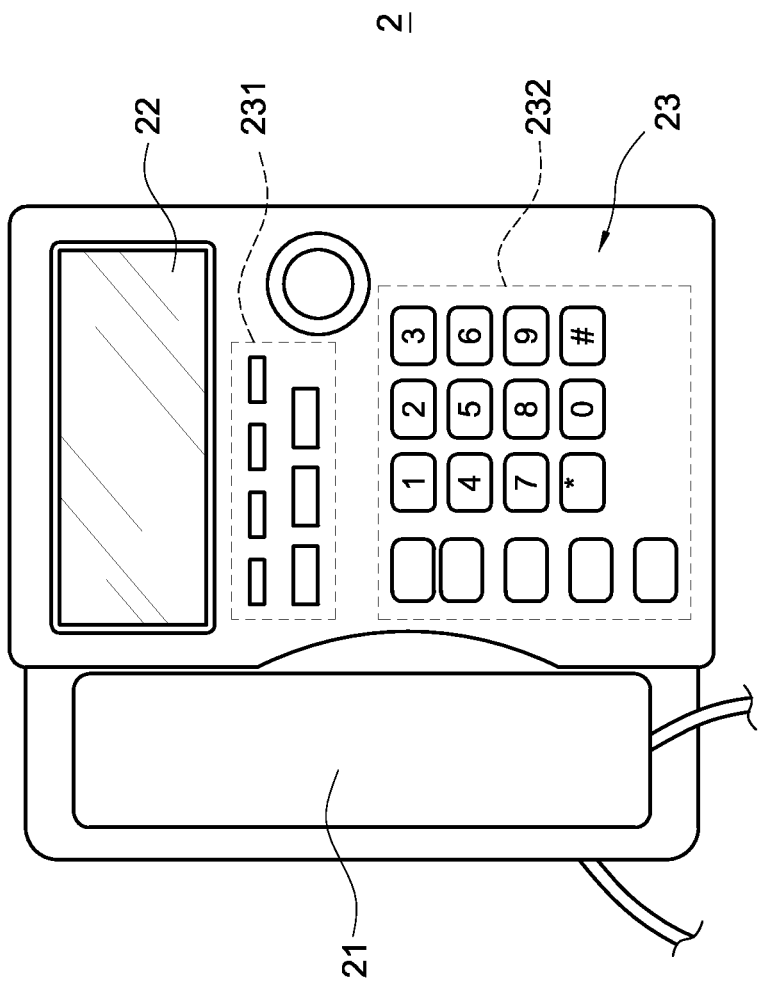
FIG. 2A is a schematic diagram of an IP phone of a preferred embodiment according to the present invention.

FIG. 2A is a schematic diagram of an IP phone of a preferred embodiment according to the present invention. The proximal IP phone 2 comprises a transmitter 21, a LCD screen 22 and an operation panel 23. The operation panel 23 can further comprises a plurality of Busy Lamp Field (BLF) keys 231 and a plurality of operation keys 232 (for example number keys, direction keys and menu keys etc.). As mentioned above, each of the proximal IP phones 2, 2' is located in the same office or using the same local area network and supports multiple wiring configurations. After setting up, the plurality of BLF keys 231 of the proximal IP phone 2 can be used for monitor current status of each extension (for example the proximal IP phone 2'). In addition, the proximal IP phone 2 is operated with the plurality of operation keys 232, such as establishing connection to the Internet, configuring address books, editing text message and dialing out voice calls.

Figure 2B:
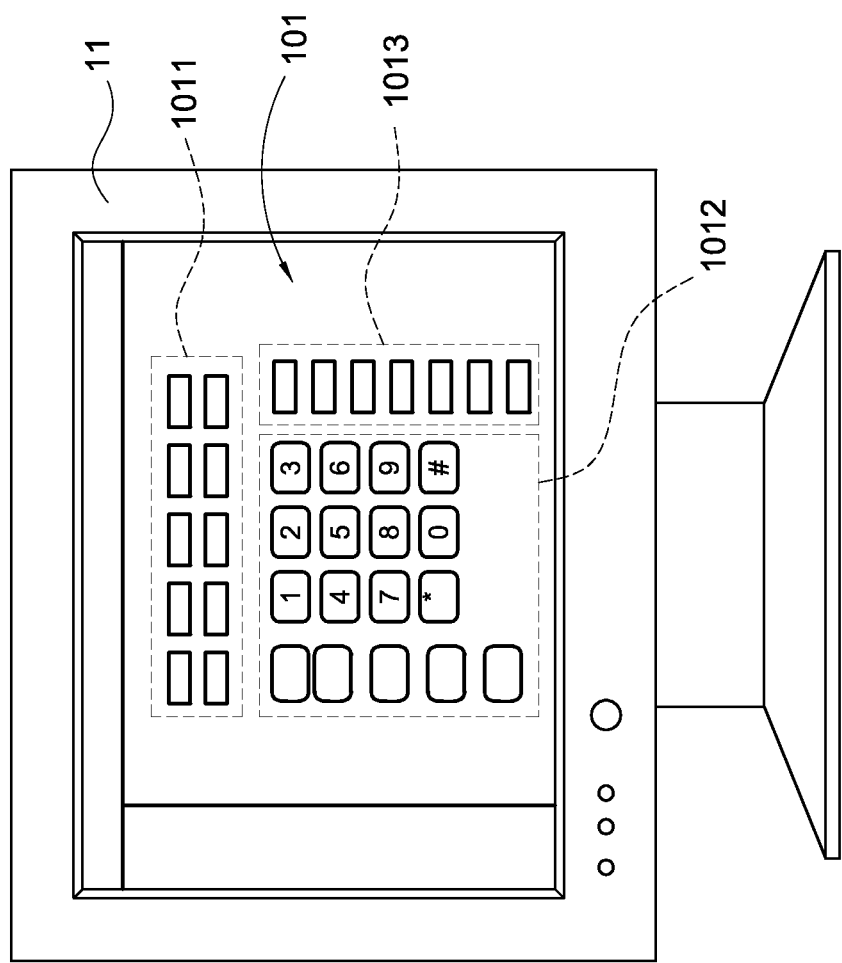
FIG. 2B is a schematic diagram of a GUI of a preferred embodiment according to the present invention.

FIG. 2B is a schematic diagram of a GUI of a preferred embodiment according to the present invention. After the application program 10 is executed by the computer 1, a Graphical User Interface (GUI) web page 101 is displayed on a computer screen 11 of the computer 1. The display content of the GUI web page 101 is based on the hardware configuration of the corresponding proximal IP phone 2 connected to the computer 1.

In FIG. 2B, the display content of the GUI web page 101 includes a plurality of virtual keys, which comprise a plurality of virtual BLF keys 1011, a plurality of virtual operation keys 1012 and a plurality of virtual expansion keys 1013 etc but is not limited thereto. The plurality of virtual BLF keys 1011 perform functions corresponding the functions of the BLF keys 231 of the proximal IP phone 2. The plurality of virtual operation key 1012 perform functions corresponding the functions of the operation keys 232 of the proximal IP phone 2. The plurality of virtual expansion key 1013 perform functions corresponding to the undefined functions of the proximal IP phone 2 (detailed in the following). Thus, the computer 1 can easily control the proximal IP phone 2 via friendly operation interface, the GUI web page 101, and a large display of the computer screen 11.

It should be noted that when the computer 1 controls the proximal IP phone 2, the application program 10 can be used for expanding hardware functions of the proximal IP phone 2. For example, if the proximal IP phone 2 is a low cost device having basic functions and does not have enough BLF keys 231, or does not have BLF keys 231 which is inconvenient in field application. Under the circumstance, the plurality of virtual BLF keys 1011 on the GUI web page 101 can simulate the function as additional BLF keys 231 and add additional virtual BLF keys 231 to the IP phone.

In another example, if the operation panel 23 of the proximal IP phone 2 is too simple to meet subscriber demands and does not have enough the operation keys 232, the functions performed by an IP phone is accordingly limited which is inconvenient to subscribers. Sometimes, the functions of the proximal IP phone 2 cannot be performed at the same time. Or subscribers have to purchase additional hardware devices for using functions of the undefined operation keys 232. In the present invention, the plurality of virtual expansion keys 1013 can be associated with corresponding undefined function and save additional hardware cost for subscribers via setting up at the GUI web page 101. Further, if subscribers consider the operation keys 232 of the proximal IP phone 2 is too small to operate, subscribers can set up internal configuration of the proximal IP phone 2 at the GUI web page 101 displayed on the large screen of the computer screen 11, such as editing address books, or setting up block lists.

Figure 3:
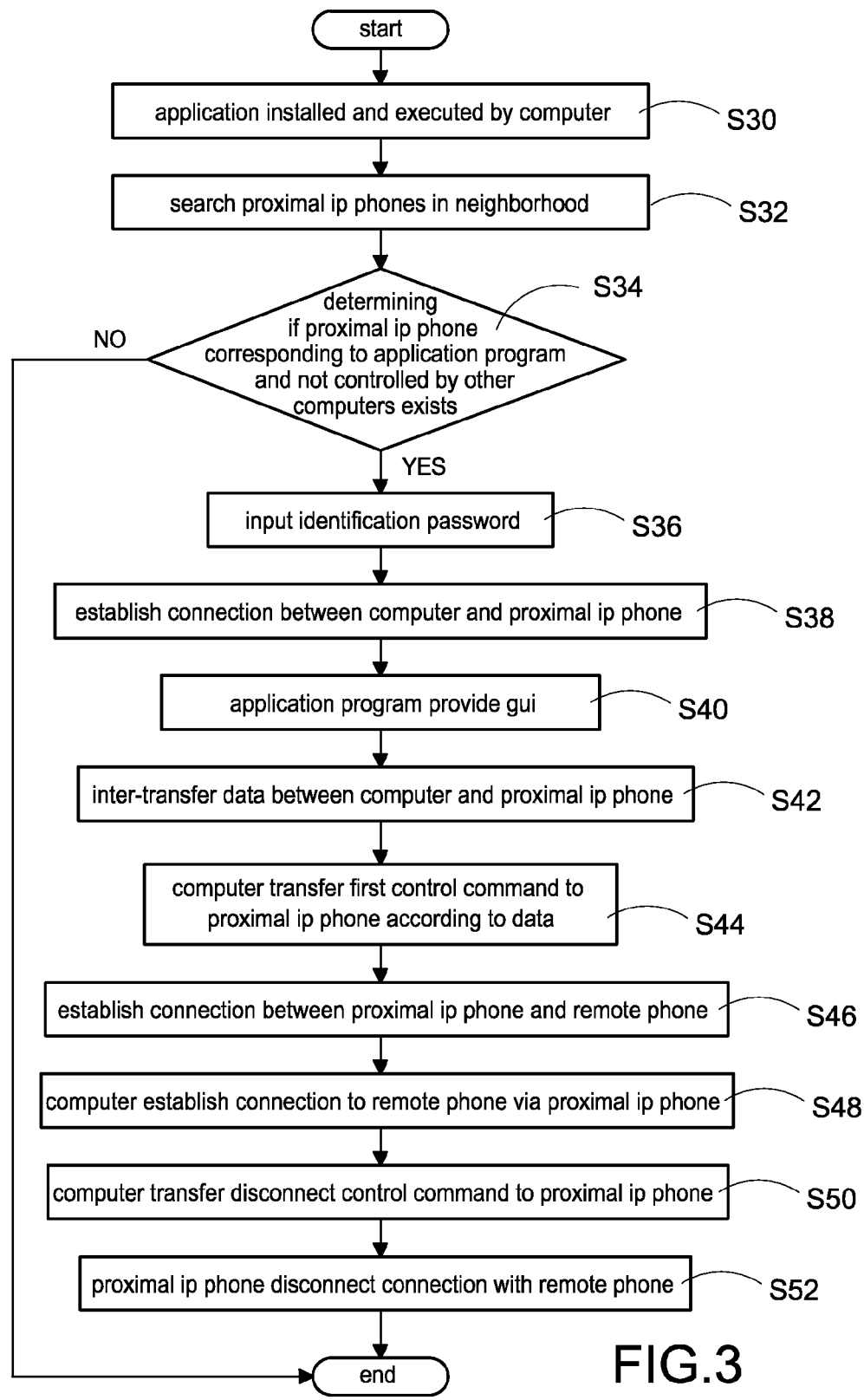
FIG. 3 is a flow chart of a preferred embodiment according to the present invention.

FIG. 3 is a flow chart of a preferred embodiment according to the present invention. First, the application program 10 is installed and executed by computer 1 (step S30). Next, the computer 1 searches for available proximal IP phones in the neighborhood via executing the application program 10 (step S32). After step S32, the computer 1 determines if a corresponding application program 10 exists, and a proximal IP phone 2 not corresponding to other computers exists in the neighborhood of the computer (step S34). If not, the computer 1 cannot control any proximal IP phone and the present invention cannot be implemented.

Following the step S34, if yes, the computer loptionally inputs an identification password of the proximal IP phone 2 depending on the desirable functions to operate on the proximal IP phone 2 (step S36). The above step is not mandatory. Upon passing the password identification, the computer 1 establishes connection to the proximal IP phone 2 via a local area network (step S38). Next, the application program 10 provides the GUI web page 101 on the computer 1 (step S40). Subscribers can operation on the GUI web page 101 to inter-transfer data D1 between the computer 1 and the proximal IP phone 2 (step S42). Next, the computer 1 transfers the first control command C1 to the proximal IP phone 2 according to the content of the data D1 (step S44).

The data D1 can be telephone number data of the remote phone 3 which the computer 1 desires to establish connection with. The data D1 can be retrieved from emails or address books of email accounts (for example Outlook email accounts) in the computer 1, or retrieved from web pages after the computer 1 or the proximal IP phone 2 is connected to the Internet, or retrieved by subscriber inputs with the operation keys 232 or the virtual operation keys 1012. The data D1 is inter-transferable between different sources and is not limited thereto.

For example, in the step S42, if the computer 1 only transfers the telephone number data to the proximal IP phone 2, which refers to that the subscriber desires to dialing out a voice call. Accordingly, in the step S44, the computer 1 transfers a telephone dialing out command to the proximal IP phone 2. The proximal IP phone 2 receives the telephone dialing out command, and uses the telephone number data to dial out a voice call to the remote phone 3 referred by the telephone number data via the Internet or PSTN. Thus, the function of Click-To-Dial is accomplished.

Further, the data D1 can also comprises text message data written by subscribers or fetched from the Internet in addition to the telephone number data. Accordingly, when the computer 1 transfers the data D1 to the proximal IP phone 2 in the step S42, which refers to that the subscriber desires to send a text message, the computer 1 transfers a text message sending command to the proximal IP phone 2 in the step S44. The proximal IP phone 2 receives the text message sending command, and uses telephone number data recorded in the data D1 to send the text message data to the remote phone 3 referred by the telephone number data via the Internet or PSTN.

It should be noted that when a subscriber operates on the proximal IP phone 2, the subscriber also can fetch the data D1 from the computer 1 via the proximal IP phone 2 and dials out telephone or sends text message from the proximal IP phone 2 according to the content of the data D1.

After the step S44, the proximal IP phone 2 establishes connection to the remote phone 3 via the Internet or PSTN and the remote phone 3 (step S46). Next, the computer 1 establishes connection to the remote phone 3 via the proximal IP phone 2 (step S48). Thus, a subscriber can monitor and perform management on connection status between the proximal IP phone 2 and the remote phone 3 via the computer 1 and perform operations according to the connection status.

Lastly, the computer 1 transfers a disconnect control command C2 to the proximal IP phone 2 (step S50). Thus, the proximal IP phone 2 disconnects the connection to the remote phone 3 according to the disconnect control command C2 (step S52).

As the skilled person will appreciate, various changes and modifications can be made to the described embodiments. It is intended to include all such variations, modifications and equivalents which fall within the scope of the invention, as defined in the accompanying claims.

What is claimed is:

1. A method for controlling an IP phone used between a computer and a proximal IP phone, the computer and the proximal IP phone being connected to the same local area network, wherein an application program is installed and executed at the computer, the control method comprising:
   a) establishing connection between the computer and the proximal IP phone;
   b) providing a graphical user interface (GUI) web page by the application program to offer a plurality of virtual keys respectively corresponding to hardware functions of the proximal IP phone on the computer, wherein the plurality of virtual keys comprising a plurality of virtual BLF (Busy Lamp Field, BLF) keys, a plurality of virtual operation keys and a plurality of virtual expansion keys, the plurality of virtual BLF keys corresponding to BLF key functions of the proximal IP phone, the plurality of virtual operation keys corresponding to operation key functions of the proximal IP phone, and the plurality of virtual expansion key corresponding to undefined functions of the proximal IP phone, wherein the quantity of the plurality of the virtual BLF keys is larger than the quantity of the physical BLF keys of the proximal IP phone, so that when the computer controls the proximal IP phone, the application program is used for expanding hardware functions of the proximal IP phone; if the proximal IP phone is a low cost device having basic functions and does not have enough BLF keys, or does not have BLF keys to cause inconvenient in field application, the plurality of virtual BLF keys simulates the function as additional BLF keys and adds additional virtual BLF keys to the proximal IP phone; if an operation panel of the proximal IP phone is too simple to meet subscriber demands and does not have enough operation keys, the function performed by the proximal IP phone is accordingly limited and is inconvenient to subscribers, the function of the proximal IP phone cannot be performed at the same time, or subscribers have to purchase additional hardware devices for using functions of the undefined operation keys, the plurality of virtual expansion keys are associated with corresponding undefined function and save additional hardware cost for subscribers via setting up at the GUI web page;
   c) using the GUI web page for transferring data between the computer and the proximal IP phone;
   d) sending first control command to the proximal IP phone according to the data;
   e) establishing connection by the proximal IP phone with remote phone according to the first control command; and
   f) establishing connection by the computer with the remote phone via the proximal IP phone.

2. The method for controlling an IP phone of claim 1, wherein the remote phone is an IP phone, and the proximal IP phone establishes voice connection with the remote phone via the Internet.

3. The method for controlling an IP phone of claim 1, wherein the remote phone is a landline phone, the proximal IP phone establishes voice connection with the remote phone via public switched telephone network (PSTN).

4. The method for controlling an IP phone of claim 1, wherein the data in the step c comprising telephone number data of the remote phone, the first control command in the step d is a telephone dialing out command.

5. The method for controlling an IP phone of claim 4, wherein the telephone number data is retrieved from emails or address books of email accounts in the computer, or input via the GUI web page.

6. The method for controlling an IP phone of claim 4, wherein the telephone number data is retrieved on web pages via connecting to the Internet at the computer or the proximal IP phone.

7. The method for controlling an IP phone of claim 1, wherein the data in the step c comprises telephone number data of the remote phone, and text message data of subscribers, and the first control command in the step d is a text message sending command.

8. The method for controlling an IP phone of claim 1, wherein the step further comprises steps:
   a01) searching available proximal IP phones in the neighborhood of the computer;
   a02) determining if a corresponding application program exists, and a proximal IP phone not corresponding to other computers exist in the neighborhood of the computer; and a03) inputting identification password if yes following step a02.

9. The method for controlling an IP phone of claim 1, wherein the method further comprises:
- g) sending disconnect control command to the proximal IP phone by the computer following step f; and
- h) disconnecting the connection with the remote phone by the proximal IP phone according to the disconnect control command.

10. A non-transitory application program installed in a computer, when the computer loads and executes the application program, a method for controlling an IP phone is executed for controlling a proximal IP phone, wherein the computer and the proximal IP phone are connected within the same local area network, and the application program for controlling the IP phone comprising:
- a) searching available proximal IP phones in the neighborhood of the computer;
- b) determining if a proximal IP phone corresponding to the application program and not controlled by other computers exists in the neighborhood of the computer;
- c) establishing connection between the computer and the proximal IP phone if yes following step b;
- d) providing a Graphical User Interface (GUI) web page by the application program to offer a plurality of virtual keyss respectively corresponding to hardware functions of the proximal IP phone on the computer, wherein the plurality of virtual keys comprising a plurality of virtual BLF (Busy Lamp Field, BLF) keys, a plurality of virtual operation keys and a plurality of virtual expansion keys, the plurality of virtual BLF keys corresponding to BLF key functions of the proximal IP phone, the plurality of virtual operation keys corresponding to operation key functions of the proximal IP phone, and the plurality of virtual expansion key corresponding to undefined functions of the proximal IP phone, wherein the quantity of the plurality of the virtual BLF keys is larger than the quantity of the physical BLF keys of the proximal IP phone, so that when the computer controls the proximal IP phone, the application program is used for expanding hardware functions of the proximal IP phone; if the proximal IP phone is a low cost device having basic functions and does not have enough BLF keys, or does not have BLF keys to cause inconvenient in field application, the plurality of virtual BLF keys simulates the function as additional BLF keys and adds additional virtual BLF keys to the proximal IP phone; if an operation panel of the proximal IP phone is too simple to meet subscriber demands and does not have enough operation keys, the function performed by the proximal IP phone is accordingly limited and is inconvenient to subscribers, the function of the proximal IP phone cannot be performed at the same time, or subscribers have to purchase additional hardware devices for using functions of the undefined operation keys, the plurality of virtual expansion keys are associated with corresponding undefined function and save additional hardware cost for subscribers via setting up at the GUI web page;
- e) using the GUI web page for transferring data between the computer and the proximal IP phone;
- f) sending first control command to the proximal IP phone according to the data;
- g) establishing connection by the proximal IP phone with remote phone according to the first control command; and
- h) establishing connection by the computer with the remote phone via the proximal IP phone.

* * * * *